(12) United States Patent
Warrow

(10) Patent No.: US 7,811,449 B2
(45) Date of Patent: Oct. 12, 2010

(54) FLOW EQUALIZED ROTATING BIOLOGICAL CONTACTOR

(75) Inventor: Theodore U. Warrow, Dearborn, MI (US)

(73) Assignee: Waste Stream Technologies, LLC, Livonia, MI (US)

(*) Notice: Subject to any disclaimer, the term of this patent is extended or adjusted under 35 U.S.C. 154(b) by 0 days.

(21) Appl. No.: 11/551,306

(22) Filed: Oct. 20, 2006

(65) Prior Publication Data

US 2007/0231218 A1    Oct. 4, 2007

Related U.S. Application Data

(60) Provisional application No. 60/730,717, filed on Oct. 27, 2005.

(51) Int. Cl.
C02F 3/08    (2006.01)

(52) U.S. Cl. .................. 210/151; 210/195.1; 210/256; 210/257.1; 210/619

(58) Field of Classification Search .............. 210/150, 210/151, 195.1, 195.3, 257.1, 258, 259, 619, 210/256

See application file for complete search history.

(56) References Cited

U.S. PATENT DOCUMENTS

| | | |
|---|---|---|
| 1,218,002 A | 3/1917 | Runcie |
| 1,811,181 A | 6/1931 | Matlby |
| 1,947,777 A | 2/1934 | Huff et al. |
| 3,193,989 A | 7/1965 | Sebeste |
| 3,335,081 A | 8/1967 | Naggar |
| 3,484,836 A | 12/1969 | Welch |
| 3,613,890 A | 10/1971 | Hellqvist |
| 3,630,366 A | 12/1971 | Joost |
| 3,645,510 A | 2/1972 | Klugman |
| 3,704,783 A | 12/1972 | Antonie |
| 3,849,303 A * | 11/1974 | Torpey ................. 210/195.3 |
| 3,904,525 A | 9/1975 | Rosenberg |
| 3,915,854 A | 10/1975 | Torpey |
| 3,932,273 A * | 1/1976 | Torpey et al. ............. 210/151 |
| 4,115,268 A | 9/1978 | Thissen |
| 4,137,172 A | 1/1979 | Sako et al. |
| 4,275,019 A | 6/1981 | Bednarski |

(Continued)

FOREIGN PATENT DOCUMENTS

DE    1958247    5/1971

(Continued)

OTHER PUBLICATIONS

International Search Report, PCT/US06/41427, Jul. 27, 2007.

(Continued)

*Primary Examiner*—Christopher Upton
(74) *Attorney, Agent, or Firm*—Preston Smirman; Smirman IP Law, PLLC

(57) ABSTRACT

A wastewater treatment system is provided that utilizes an equalization tank that stores hydraulic surge flows from the collection system and uses a waterwheel to transfer a maximum flow equal to plant design flow to the downstream treatment systems. The waterwheel aerates the raw wastewater in the equalization tank and prevents it from going septic and causing unacceptable odors. Because the waterwheel cannot transfer more than plant design flow to the downstream treatment elements, these elements will never experience a hydraulic overload.

13 Claims, 11 Drawing Sheets

U.S. PATENT DOCUMENTS

| | | | |
|---|---|---|---|
| 4,279,753 A | 7/1981 | Nielson et al. | |
| 4,289,626 A * | 9/1981 | Knopp et al. | 210/619 |
| 4,303,527 A | 12/1981 | Reimann et al. | |
| 4,345,997 A | 8/1982 | McConnell, Jr. et al. | |
| 4,385,987 A | 5/1983 | McGinley et al. | |
| 4,387,020 A | 6/1983 | Hill | |
| 4,399,031 A | 8/1983 | Imano et al. | |
| 4,431,537 A | 2/1984 | Hirota | |
| 4,444,658 A | 4/1984 | Hankes et al. | |
| 4,468,326 A | 8/1984 | Kawert | |
| 4,532,038 A | 7/1985 | Reid | |
| 4,537,678 A | 8/1985 | Thissen | |
| 4,549,962 A | 10/1985 | Koelsch | |
| 4,608,162 A | 8/1986 | Hankes et al. | |
| 4,692,241 A | 9/1987 | Nicholson | |
| 4,692,250 A * | 9/1987 | Miller | 210/619 |
| 4,724,593 A | 2/1988 | Lang | |
| 4,737,278 A | 4/1988 | Miller | |
| 4,999,302 A | 3/1991 | Kahler et al. | |
| 5,290,435 A * | 3/1994 | Stilkenboom | 210/151 |
| 5,395,529 A * | 3/1995 | Butler | 210/619 |
| 5,407,578 A | 4/1995 | Nathwani | |
| 5,419,831 A | 5/1995 | Fuerst et al. | |
| 5,423,978 A | 6/1995 | Snyder et al. | |
| 5,425,874 A | 6/1995 | Gass | |
| 5,458,817 A | 10/1995 | Lang | |
| 5,498,376 A | 3/1996 | St. Louis et al. | |
| 5,637,263 A | 6/1997 | Lang et al. | |
| 5,665,236 A * | 9/1997 | Van Den Berg | 210/619 |
| 5,679,253 A | 10/1997 | Fuerst et al. | |
| 5,714,097 A | 2/1998 | St. Louis et al. | |
| 5,851,636 A | 12/1998 | Lang et al. | |
| 5,853,591 A | 12/1998 | Snyder et al. | |
| 5,897,771 A * | 4/1999 | Yoshimura | 210/150 |
| 6,071,593 A | 6/2000 | Lang et al. | |
| 6,241,222 B1 | 6/2001 | Lang | |
| 6,403,366 B1 | 6/2002 | Kim | |
| 6,540,920 B2 | 4/2003 | Bounds et al. | |
| 6,783,669 B1 | 8/2004 | Okagawa et al. | |
| 6,830,690 B2 * | 12/2004 | Schmid | 210/151 |
| 6,949,191 B1 * | 9/2005 | Petrone | 210/151 |
| 2005/0133444 A1 | 6/2005 | Warrow | |

FOREIGN PATENT DOCUMENTS

| | | |
|---|---|---|
| EP | 0161077 | 11/1985 |
| WO | 92/10431 | 6/1992 |

OTHER PUBLICATIONS

Supplementary European Search Report, PCT/US2006041427, Sep. 30, 2008, 8 pages.

* cited by examiner

FLOW EQUALIZED ROTATING BIOLOGICAL CONTACTOR

CROSS-REFERENCE TO RELATED APPLICATION

The instant application claims priority to U.S. Provisional Patent Application Ser. No. 60/730,717, filed Oct. 27, 2005, the entire specification of which is expressly incorporated herein by reference.

FIELD OF THE INVENTION

The present invention relates generally to wastewater treatment systems, and more particularly to wastewater treatment systems employing rotating biological contactors ("RBCs") that include fluid transfer systems for the prevention of hydraulic overload of the treatment systems or components thereof.

BACKGROUND OF THE INVENTION

An RBC is typically comprised of a rotating shaft to which is attached a bank, or multiple banks, of media that are then in turn rotated by the shaft. A plurality of parallel support shafts is typically employed to aid in the support of the media. The media is typically located such that about 40 percent of the media is, at any given time, immersed in the wastewater to be cleaned. As the media rotates slowly into and out of the wastewater, microorganisms attach themselves to the media, forming a biomass, and consume contaminants from the wastewater. As the media rotates into the air above the wastewater tank, the microorganisms biodegrade these contaminants, e.g., into carbon dioxide and water. Examples of technology related to the treatment of wastewater and other substances can be found with reference to the following U.S. patents listed in the Table, below, the entire disclosures of which are expressly incorporated herein by reference:

TABLE

| U.S. Pat. No. | Inventor(s) | Title |
|---|---|---|
| 1,811,181 | Maltby | Process and Apparatus for Treating Sewage or Other Organic Matters |
| 1,947,777 | Huff et al. | Filling Unit |
| 3,193,989 | Sebeste | Aerating Waste Treatment Apparatus |
| 3,335,081 | El-Naggar | Method of Treatment of Sewage by Bio-Oxidation and Apparatus Therefor |
| 3,484,836 | Welch | Rotating Biological Contactor in Sewer |
| 3,630,366 | Joost | Rotating Biological Waste Treatment System |
| 3,645,510 | Klugman | Grid Member and Wall Formed Therefrom |
| 3,704,783 | Antoine | Apparatus for Treating Sewage |
| 3,904,525 | Rosenberg et al. | Waste Treatment Apparatus |
| 3,915,854 | Torpey | Wastewater Treatment |
| 4,115,268 | Thissen | Waste Water Treatment Rotor |
| 4,137,172 | Sako et al. | Rotating Biological Contactor |
| 4,275,019 | Bednarski | A Modular Heaping-Type Packing Element |
| 4,279,753 | Nielson et al. | Wastewater Treatment System Including Multiple Stages of Alternate Aerobic-Anaerobic Bioreactors in Series |
| 4,303,527 | Reimann et al. | Surge Control in the Biological Purification of Wastewater |
| 4,345,997 | McConnell, Jr. et al. | Media |
| 4,385,987 | McGinley et al. | Waste Treatment Apparatus |
| 4,387,020 | Hill | Flow Control Apparatus |
| 4,399,031 | Imano et al. | Biological Sewage Treatment Apparatus of the Rotary Disc Type |
| 4,431,537 | Hirota | Revolving Contactors for the Biological Treatment of Waste Water |
| 4,444,658 | Hankes et al. | Rotating Biological Contactor Apparatus |
| 4,468,326 | Kawert | Process in Microbiological Purification and a Device and Materials Therefor |
| 4,532,038 | Reid | Flow Control Apparatus for Aerobic Sewage Treatment |
| 4,537,678 | Thissen | Rotary Biological Contactor |
| 4,549,962 | Koelsch | Rotating Biological Contactor |
| 4,608,162 | Hankes et al. | Rotating Biological Contactor Apparatus |
| 4,692,241 | Nicholson | Sewage Treatment Biological Rotors |
| 4,724,593 | Lang | Method and Blank for the Manufacture of High Efficiency Open Volumed Packing Bodies |
| 4,737,278 | Miller | Miniturized Modular Rotating Biological Contactor System |
| 4,999,302 | Kahler et al. | Biological Contact Gas Scrubber for Waste Gas Purification |
| 5,407,578 | Nathwani | Waste Water Treatment Process |
| 5,419,831 | Fuerst et al. | Rotating Biological Aquarium Filter System |
| 5,423,978 | Snyder et al. | Rotating Biologic Aquarium Filter System |
| 5,425,874 | Gass | Rotating Contactor Including Cross Flow Media for the Biological Treatment of Waste Water |
| 5,458,817 | Lang | Folding Packing and Method of Manufacture |
| 5,498,376 | St. Louis et al. | Packing |
| 5,637,263 | Lang et al. | Multifold Packing and Method of Forming |
| 5,679,253 | Fuerst et al. | Rotating Biological Aquarium Filter System |
| 5,714,097 | St. Louis et al. | Packing |
| 5,851,636 | Lang et al. | Ceramic Packing With Channels for Thermal and Catalytic Beds |
| 5,853,591 | Snyder et al. | Rotating Biological Aquarium Filter System |
| 6,071,593 | Lang et al. | Ceramic Packing With Channels for Thermal and Catalytic Beds |
| 6,241,222 | Lang | Stacked Packing With Spacing Features |
| 6,403,366 | Kim | Method and Apparatus for Treating Volatile Organic Compounds, Odors, and Biodegradable in Air Emissions |
| 6,540,920 | Bounds et al. | Wastewater Treatment System Utilizing Textile Filter Media |
| 6,783,669 | Okagawa et al. | Rotating Disk Type Sewage Treatment Device |

Another example of technology related to the treatment of wastewater and other substances can be found with reference to U.S. Patent Publication No. 20050133444, published Jun. 23, 2005, corresponding to U.S. patent application Ser. No. 10/997,117, filed Nov. 24, 2004, the entire specifications of both of which are expressly incorporated herein by reference, which describes a self-cleansing media and systems incorporating the same, for a rotating biological contactor. The media includes a disk having cones extending perpendicularly from the surface thereof. Two or more disks lock together, axially about a rotating central shaft, by connecting cones spaced throughout the disk surface having a socket at their base to receive the top of the corresponding connecting cone on the adjacent disk. The cones, by virtue of their length, space the disks a desired distance. The disks include disk segments that can link to one another along either straight and/or curved portions thereof. The geometry of the media provides free passage of the air and water during each revolution, and while the base disk slices through the air and water, the projecting cones or cylinders enter the air and water perpendicular to the direction of rotation and are washed and cleansed during each rotation.

With respect to domestic wastewater, it is mainly composed of normal household discharge. This discharge is typically characterized by peak flows in the morning hours (e.g., when people are bathing, preparing breakfast, and/or the like) and in the late afternoon hours (e.g., when people are preparing dinner, doing laundry, washing dishes, and/or the like). These peak flows are normally in the range of two to four times the average daily flows and occur for approximately two hours over the course of the day. This normally adds about twenty percent of the average daily flow to plant flow during the hours of peak flow. If these peak flows are not addressed and handled in some manner they can cause undesirable consequences for many of the wastewater treatment technologies in use today, including RBCs. Many different methods have been utilized by the wastewater treatment industry to overcome the effects of these peak flow hydraulic surges.

For example, a natural method occurs when the normal average flow is very large, or in excess of fifty million gallons per day. In systems treating these very large flows, sufficient variation in lifestyle and consequently household wastewater production occurs to smooth out the peaks and valleys in the volume curve of normal domestic flow. This produces a slightly higher design flow but because it is fairly constant it is easily handled by plant design.

However, in smaller wastewater treatment plants these hydraulic surges can and do cause upsets, overflows to the environment, and equipment failure, all of which must be addressed. The most common solution is to install an equalization tank in the fluid flow before these hydraulic surges can cause problems with the process flow. These equalization tanks, however, cause facility problems of their own. The typical location of the equalization tank in the fluid flow is after the preliminary screening and debris removal and before the primary settling system. This is raw sewage and it normally has very low oxygen content and a high level of very repugnant odors. In order to minimize the odor, many facilities utilize blowers to add oxygen in an effort to make the equalizing fluid aerobic. During part of the normal cycle this is effective, but for the rest of the cycle this causes an increased odor problem by blowing the odor into the surrounding air. In some cases hooding, collecting and treating the odor is effective, but it is costly.

In other cases, the primary settling tank doubles as an equalization tank. This is effective and enables the primary equipment to help control the odor. The main problem with this approach, however, is that the size of the primary tank must be increased by at least twenty percent and the volume of flow continuing into the plant flow must not exceed plant design flow. This flow transfer problem is hampered by the variations in fluid surface due to the variation in flow. Adjusting this variation in flow can be accomplished in many ways but is costly, and typically requires a lot of operation and monitoring man-hours as well as adding to the maintenance costs.

Therefore, there exists a need for new and improved wastewater treatment systems, especially those that employ rotating biological contactors and the like, that overcome at least one of the aforementioned problems.

SUMMARY OF THE INVENTION

In accordance with the general teachings of the present invention, new and improved wastewater treatment systems are provided. More specifically, new and improved wastewater treatment systems that employ rotating biological contactors are provided. Still more specifically, new and improved wastewater treatment systems are provided that utilize an equalization tank that stores hydraulic surge flows from the collection system and use a waterwheel or like device to transfer a maximum flow equal to plant design flow to the downstream treatment systems.

In accordance with one aspect of the present invention, a wastewater treatment system is provided that utilizes an equalization tank that stores hydraulic surge flows from the collection system and the use of a waterwheel to transfer a maximum flow equal to plant design flow to the downstream treatment systems. The waterwheel aerates the raw wastewater in the equalization tank and prevents it from going septic and causing unacceptable odors. In addition, because the waterwheel cannot transfer more than plant design flow to the downstream treatment elements, these elements will never experience a hydraulic overload. This provides more stability and consistency to the remaining wastewater treatment systems.

By way of a non-limiting example, the waterwheel transfers the wastewater into a primary settling tank, e.g., via one or more fluid containers that are operable to pick up an amount of wastewater from the equalization tank and deposit it into the primary settling tank (e.g., a tiltable bucket and/or the like). By way of another non-limiting example, a four stage rotating biological contactor (RBC) can be employed that is rotating in a segmented bio-zone trough that is resting in the wastewater in the primary settling tank. The first stage of the RBC is hydraulically linked to the primary settling tank. The RBC can be mounted on an axial shaft system, with a drive motor on one end, which also includes a shaft section rotating the equalization waterwheel. This shaft system can be mounted such that about forty percent of the media disks are submerged in the wastewater being treated in the bio-zone trough. The fluid flow of the primary wastewater through the RBC begins at the first stage and follows a serpentine pattern through the stage separating baffles of the bio-zone trough.

When this flow reaches the forth stage, a waterwheel can recirculate plant design flow back into the primary settling tank. This relatively clean, oxygen-rich treated wastewater dilutes the fluid in the primary settling tank, and also adds active microorganisms and oxygen to aid the activated sludge activity occurring in the primary settling tank. This recirculation is also continuously feeding the accumulated sludge, in the primary settling tank, to the biomass on the RBC media. This enables the plant to operate in conditions of very low flow or no flow for up to six months. A fluid flow equal to that transferred by the equalization waterwheel passes through the fourth stage of the RBC into the secondary settling tank by way of a transfer weir. The sludge collected in the secondary settling tank, which is oxygen-rich and contains much of the nitrates and nitrites from the RBC, can be recirculated into the equalization tank. This recirculation can be performed by an airlift pump system that operates, for example, for a time period every hour or part thereof. This recirculation helps to keep the equalization fluid aerobic and significantly increases denitrification. Supernatant can be drawn off the secondary settling tank and passed through tertiary equipment (if needed), disinfected (if needed), post-aerated (if needed) and discharged.

In accordance with a first embodiment of the present invention, a wastewater treatment system is provided, comprising: (1) an equalization tank; (2) a settling tank; (3) a transfer system for transferring a predetermined amount of wastewater flow from the equalization tank to the settling tank; and (4) a rotating biological contactor system in fluid communication with the settling tank.

In accordance with one aspect of this embodiment, the transfer system comprises a rotating member having at least one fluid transfer member operably associated therewith.

In accordance with another aspect of this embodiment, the rotating biological contactor is selectively operable to receive and treat wastewater.

In accordance with still another aspect of this embodiment, a recirculation system is provided for recirculating the treated wastewater or a component thereof from the rotating biological contactor system to the settling tank.

In accordance with yet another aspect of this embodiment, a second settling tank is provided, wherein the second settling tank is in fluid communication with the rotating biological contactor system.

In accordance with still yet another aspect of this embodiment, a second transfer system is provided for transferring an amount of any solid wastes from the second settling tank to the equalization tank.

In accordance with a further aspect of this embodiment, the predetermined amount of wastewater flow substantially corresponds to an amount of wastewater flow that represents an upper limit that may be handled by the wastewater treatment system.

In accordance with a second embodiment of the present invention, a wastewater treatment system is provided, comprising: (1) an equalization tank; (2) a settling tank; (3) a transfer system for transferring a predetermined amount of wastewater flow from the equalization tank to the settling tank, wherein the transfer system comprises a rotating member having at least one fluid transfer member operably associated therewith; and (4) a rotating biological contactor system in fluid communication with the settling tank.

In accordance with an aspect of this embodiment, the rotating biological contactor is selectively operable to receive and treat wastewater.

In accordance with another aspect of this embodiment, a recirculation system is provided for recirculating the treated wastewater or a component thereof from the rotating biological contactor system to the settling tank.

In accordance with still another aspect of this embodiment, a second settling tank is provided, wherein the second settling tank is in fluid communication with the rotating biological contactor system.

In accordance with yet another aspect of this embodiment, a second transfer system is provided for transferring an amount of any solid wastes from the second settling tank to the equalization tank.

In accordance with still yet another aspect of this embodiment, the predetermined amount of wastewater flow substantially corresponds to an amount of wastewater flow that represents an upper limit that may be handled by the wastewater treatment system.

In accordance with a third embodiment of the present invention, a wastewater treatment system is provided, comprising: (1) an equalization tank; (2) a settling tank; (3) a transfer system for transferring a predetermined amount of wastewater flow from the equalization tank to the settling tank, wherein the transfer system comprises a rotating member having at least one fluid transfer member operably associated therewith; (4) a rotating biological contactor system in fluid communication with the settling tank, wherein the rotating biological contactor is selectively operable to receive and treat wastewater; and (5) a recirculation system for recirculating the treated wastewater or a component thereof from the rotating biological contactor system to the settling tank.

In accordance with an aspect of this embodiment, a second settling tank is provided, wherein the second settling tank is in fluid communication with the rotating biological contactor system.

In accordance with another aspect of this embodiment, a second transfer system is provided for transferring an amount of any solid wastes from the second settling tank to the equalization tank.

In accordance with still another aspect of this embodiment, the predetermined amount of wastewater flow substantially corresponds to an amount of wastewater flow that represents an upper limit that may be handled by the wastewater treatment system.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

In accordance with the general teachings of the present invention, a wastewater treatment system is provided that utilizes an equalization tank that stores hydraulic surge flows from the collection system and the use of a waterwheel to transfer a maximum flow equal to plant design flow to the downstream treatment systems. The waterwheel aerates the raw wastewater in the equalization tank and prevents it from going septic and causing unacceptable odor. In addition, because the waterwheel cannot transfer more than plant design flow to the downstream treatment elements, these elements will never experience a hydraulic overload. This provides more stability and consistency to the remaining wastewater treatment systems.

Figure 1:
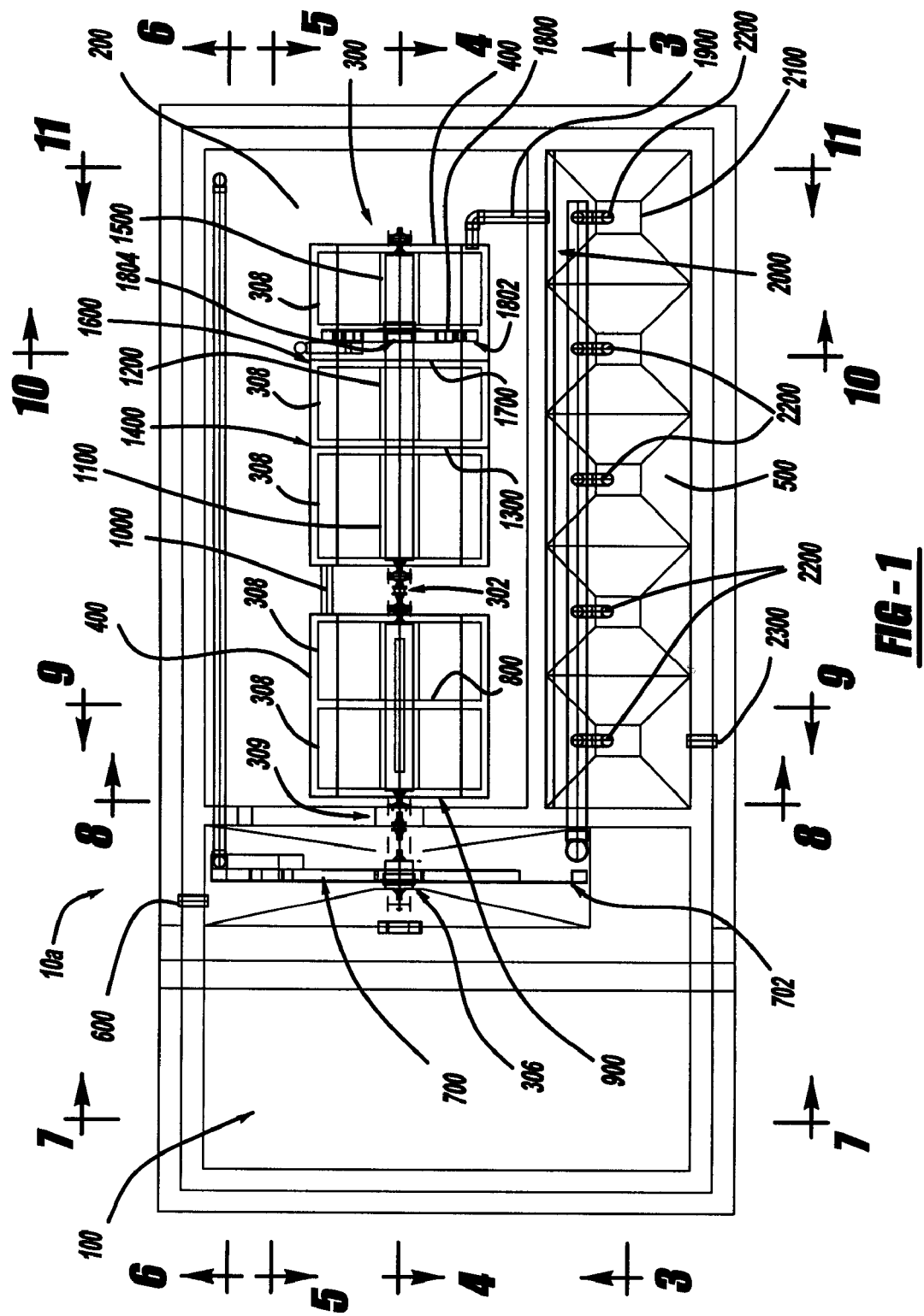
FIG. 1 is a plan view of a wastewater treatment system, in accordance with the general teachings of the present invention.
Figure 2:
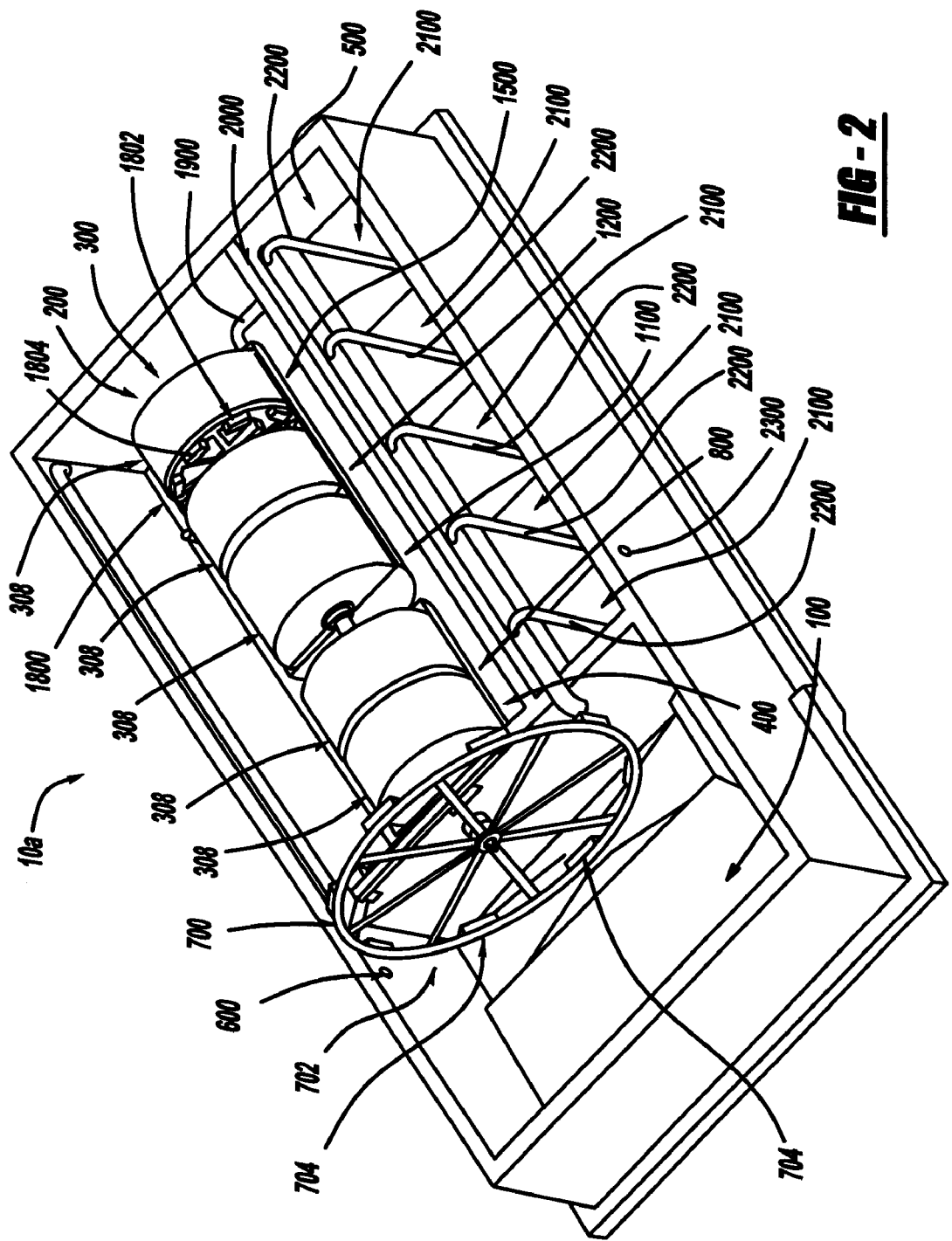
FIG. 2 is a perspective view of the wastewater treatment system depicted in FIG. 1, in accordance with the general teachings of the present invention.
Figure 3:
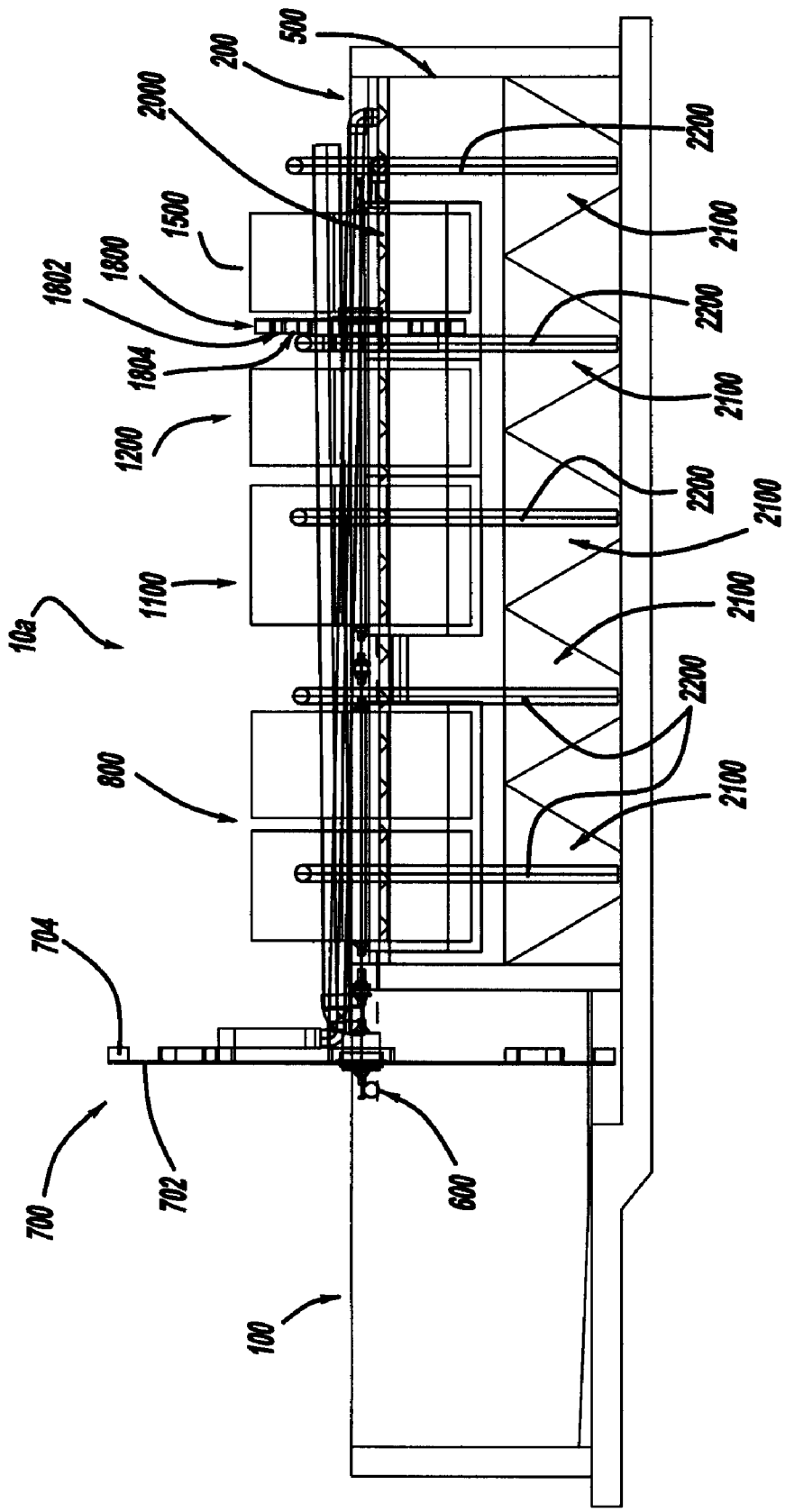
FIG. 3 is a sectional view taken along line 3-3 of FIG. 1, in accordance with the general teachings of the present invention.
Figure 4:
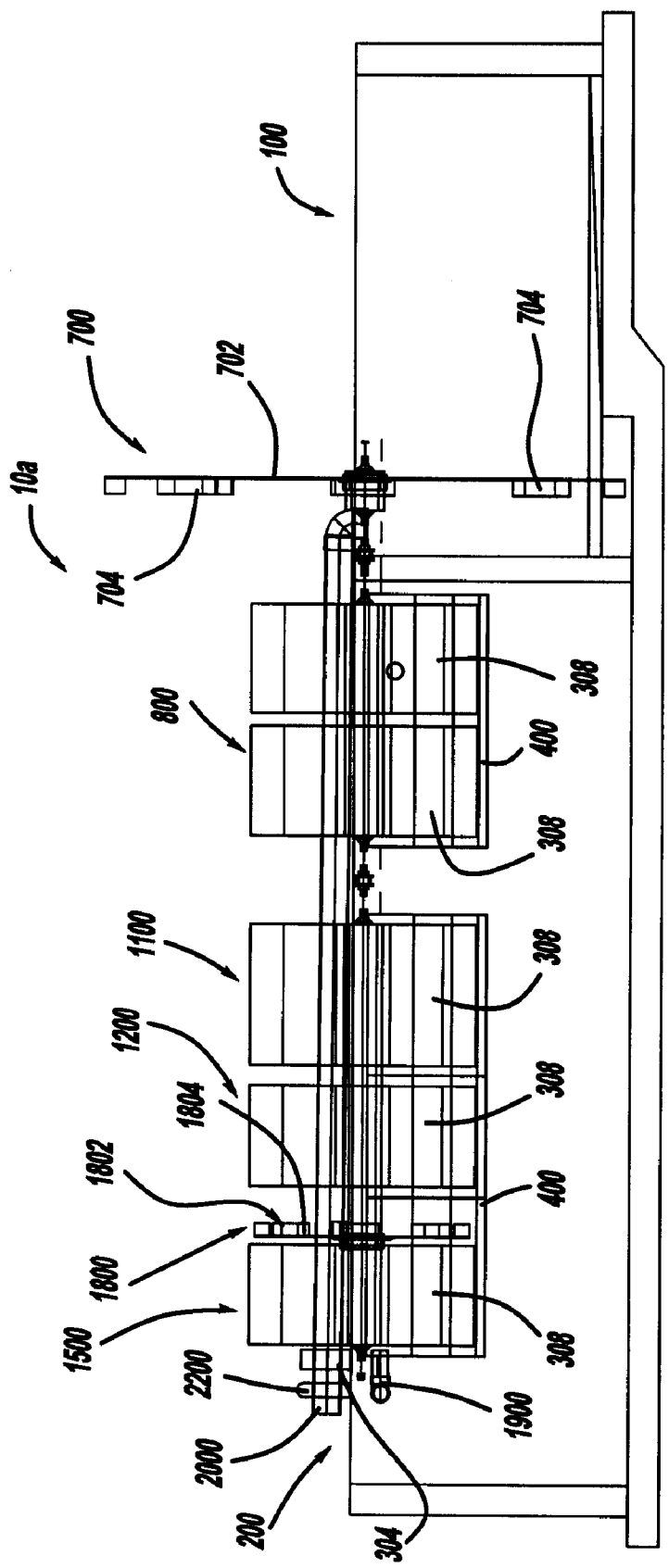
FIG. 4 is a sectional view taken along line 4-4 of FIG. 1, in accordance with the general teachings of the present invention.
Figure 5:
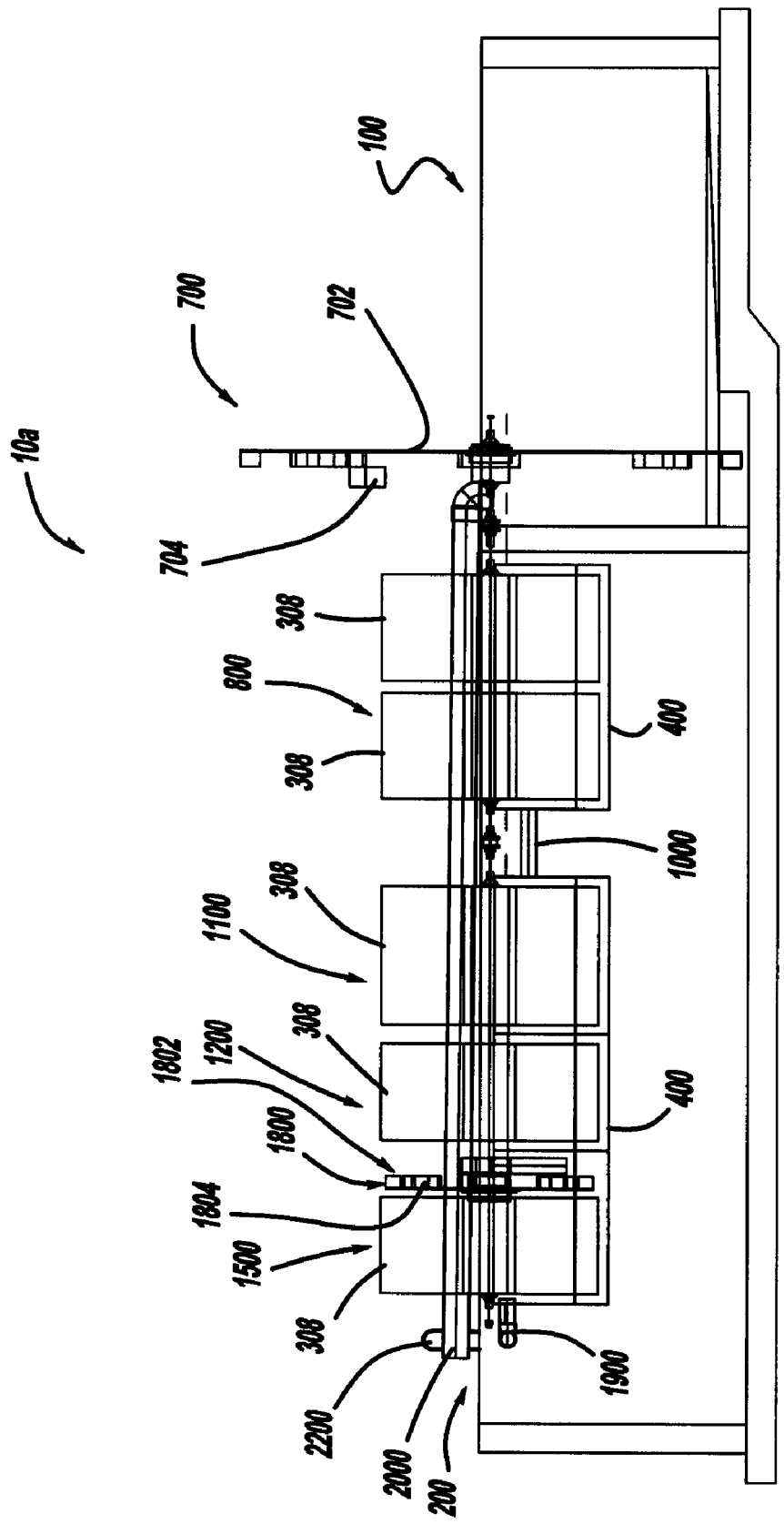
FIG. 5 is a sectional view taken along line 5-5 of FIG. 1, in accordance with the general teachings of the present invention.
Figure 6:
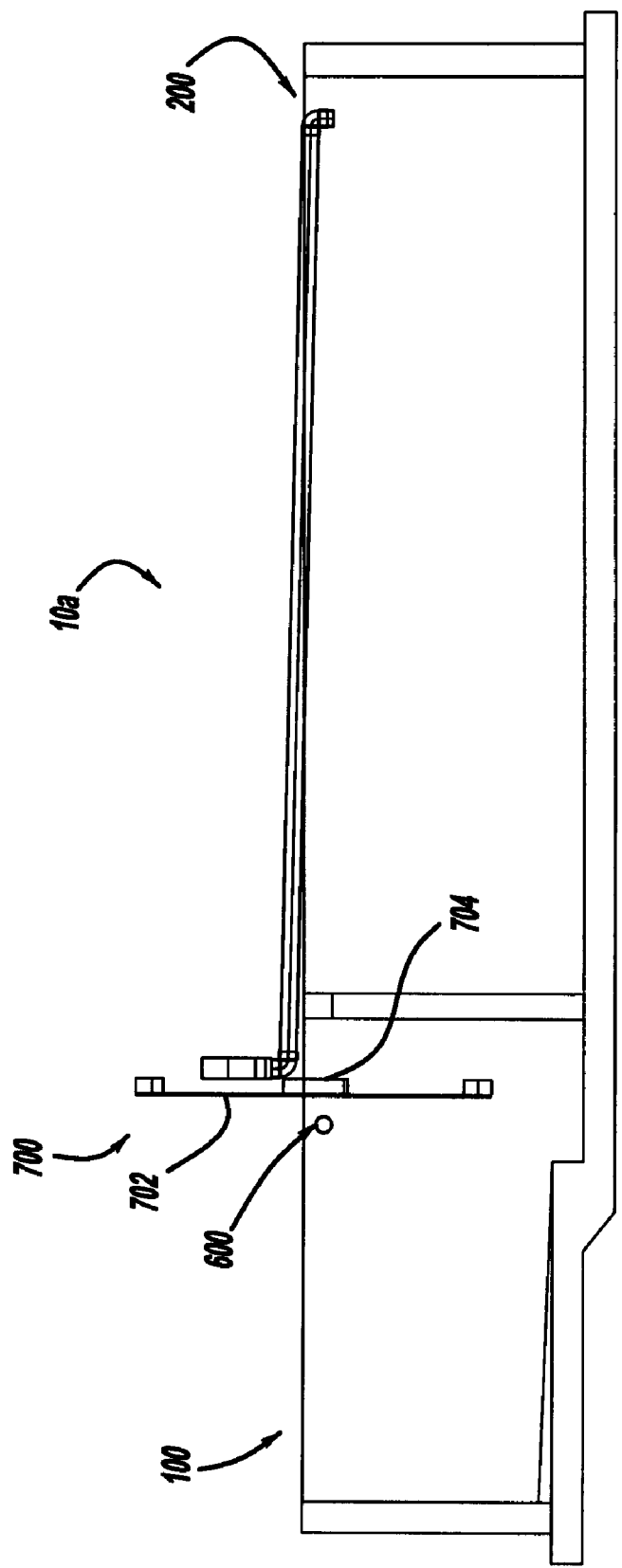
FIG. 6 is a sectional view taken along line 6-6 of FIG. 1, in accordance with the general teachings of the present invention.
Figure 7:
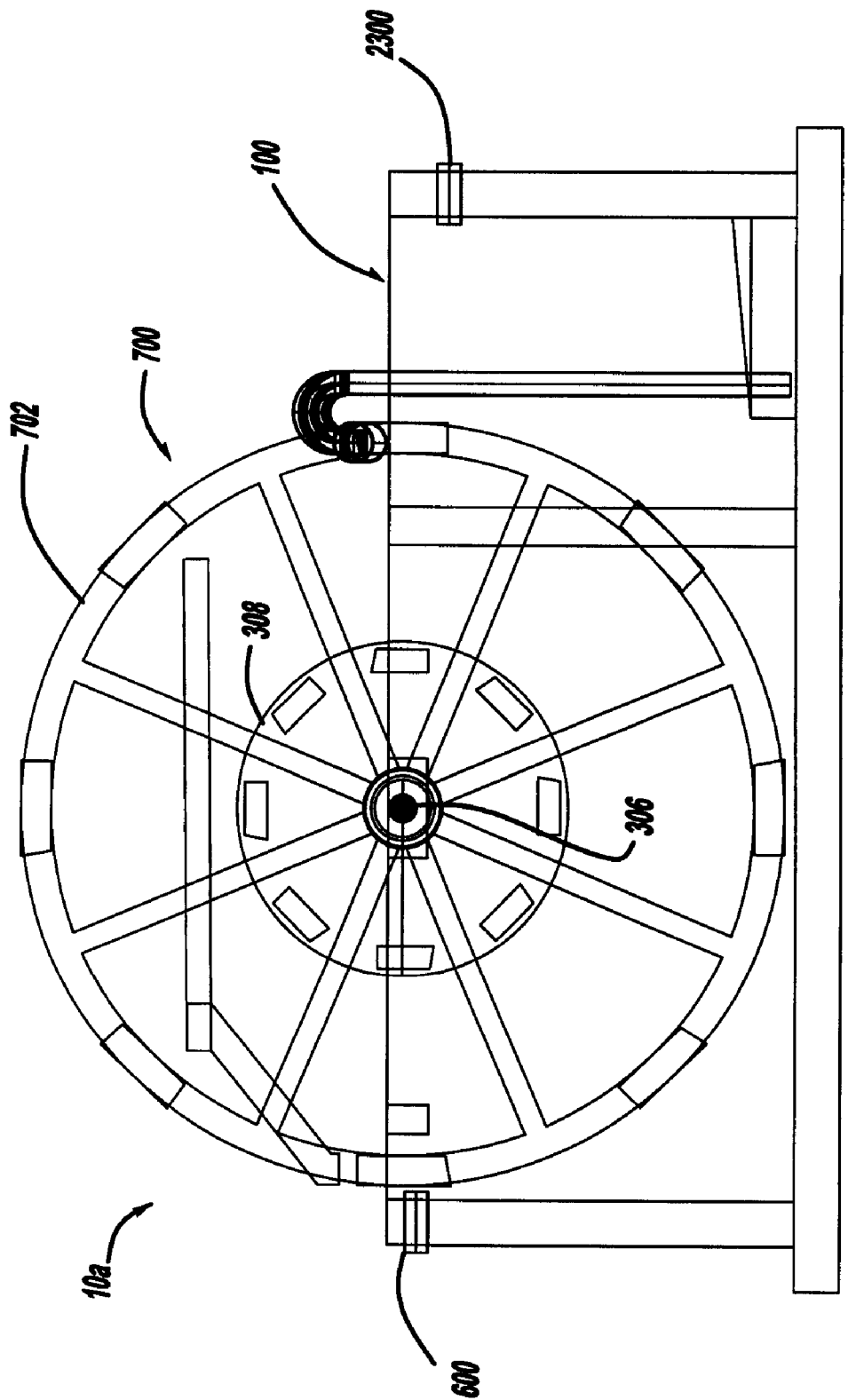
FIG. 7 is a sectional view taken along line 7-7 of FIG. 1, in accordance with the general teachings of the present invention.
Figure 8:
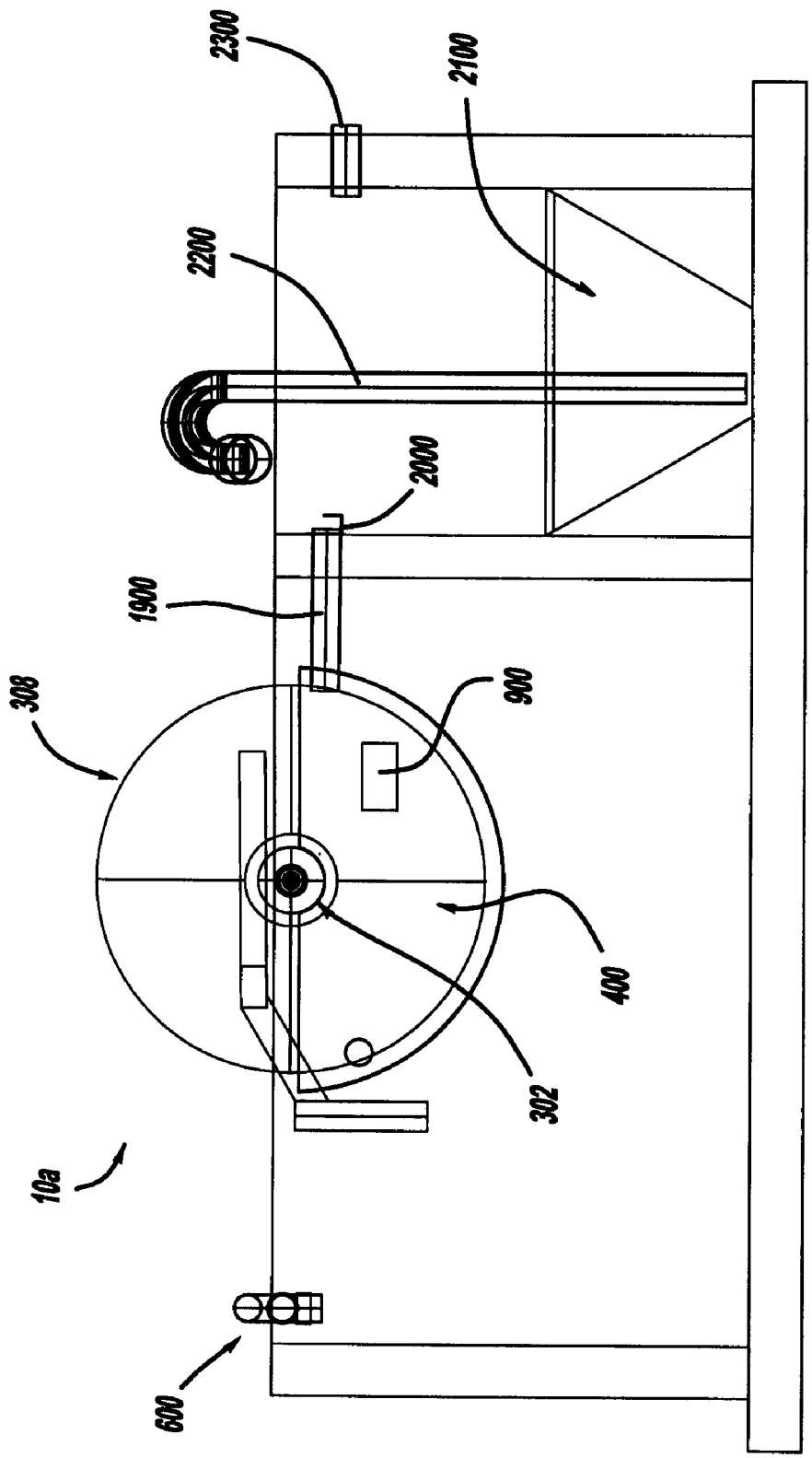
FIG. 8 is a sectional view taken along line 8-8 of FIG. 1, in accordance with the general teachings of the present invention.
Figure 9:
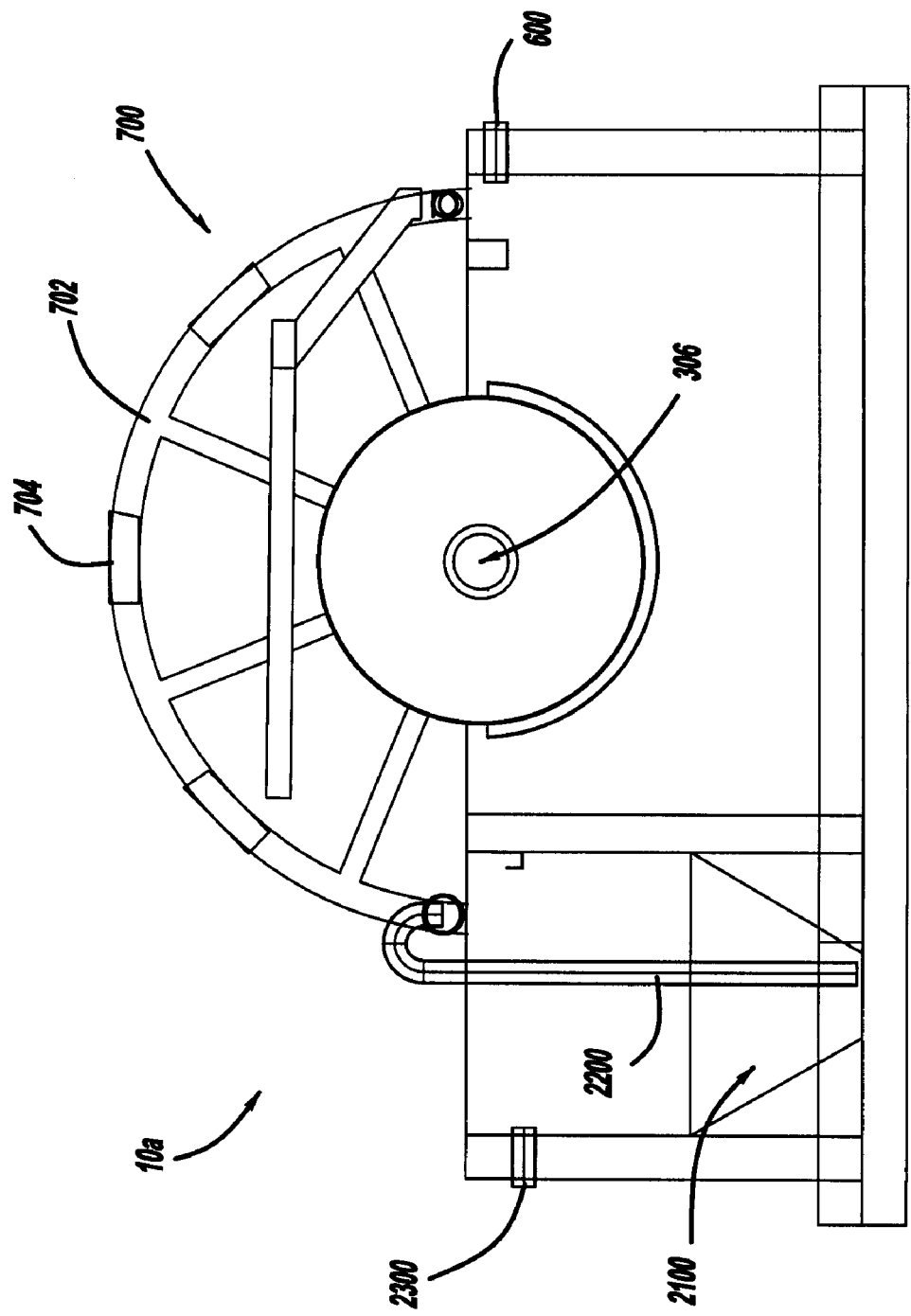
FIG. 9 is a sectional view taken along line 9-9 of FIG. 1, in accordance with the general teachings of the present invention.
Figure 10:
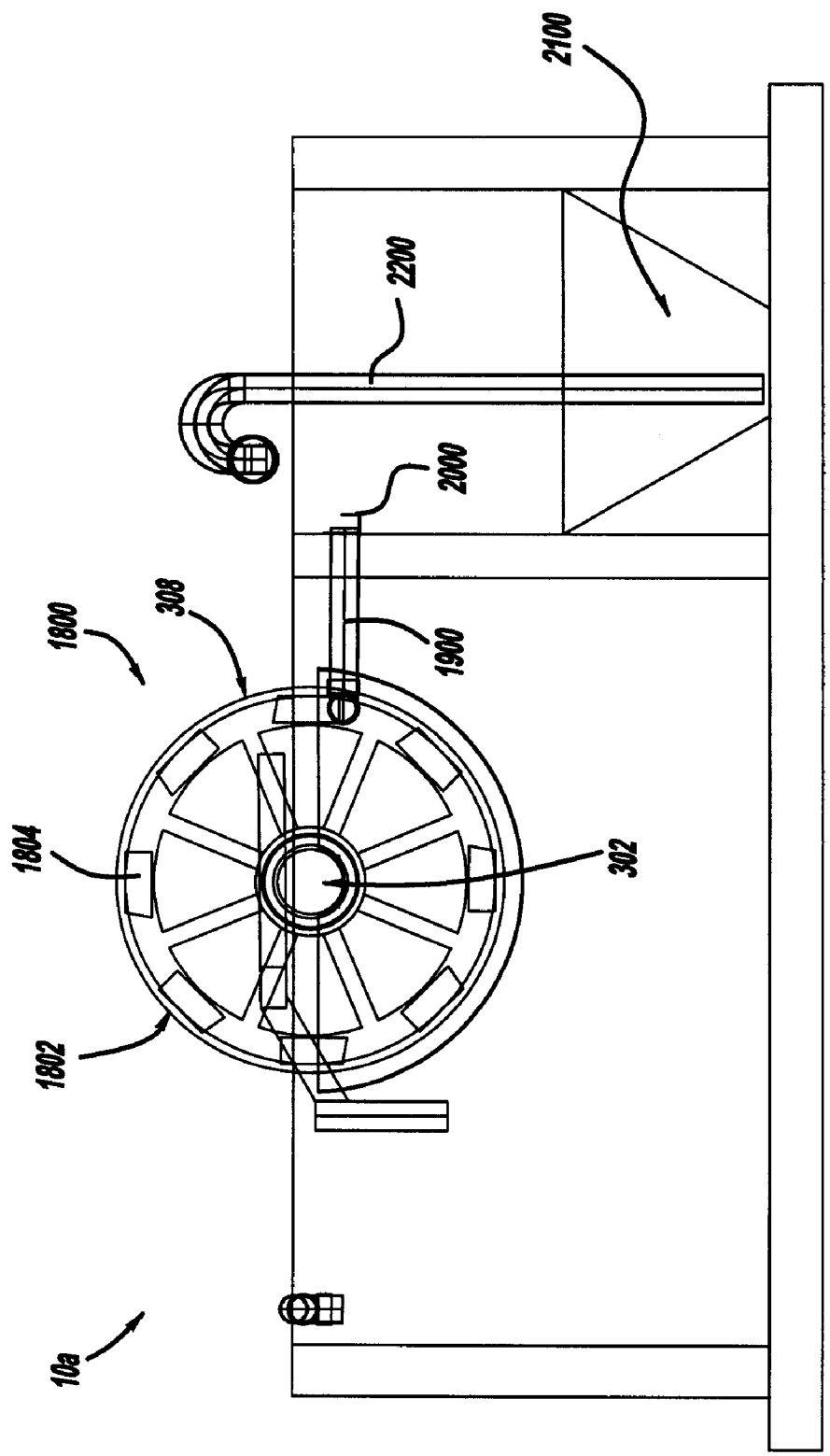
FIG. 10 is a sectional view taken along line 10-10 of FIG. 1, in accordance with the general teachings of the present invention.
Figure 11:
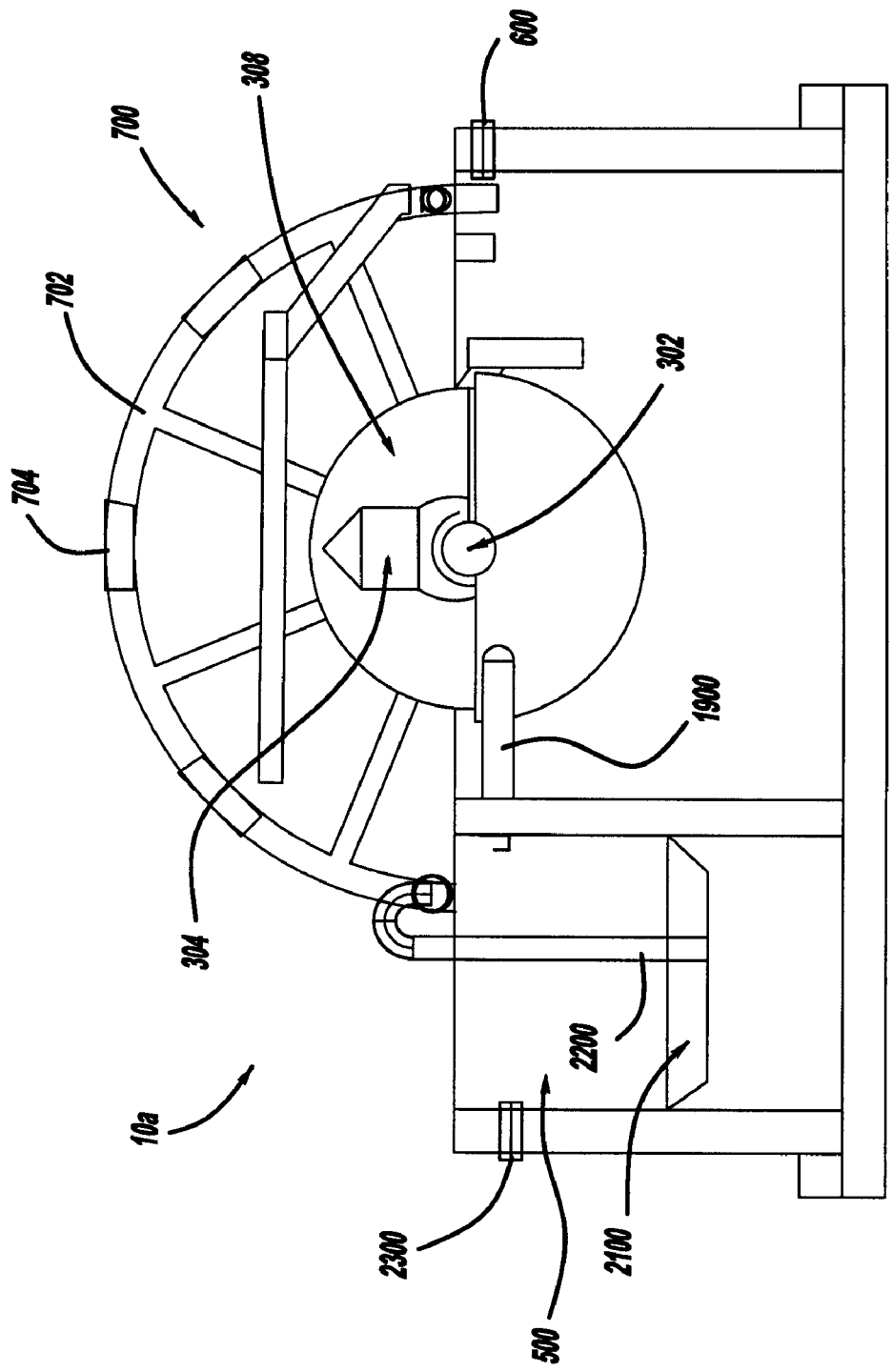
FIG. 11 is a sectional view taken along line 11-11 of FIG. 1, in accordance with the general teachings of the present invention.

Referring to FIGS. 1-11, a flow equalizing wastewater treatment system 10a is provided that primarily includes: an equalization tank 100, a primary settling tank 200, a rotating biological contactor (RBC) system 300 rotating in at least one bio-zone tank 400, and a secondary or final settling tank 500.

In accordance with a non-limiting example, raw wastewater from a sewage collection system enters the equalization tank 100 through an inlet pipe 600, where it is stored to prevent the peak flows from periodically overloading the rest of the treatment plant. A transfer system 700, e.g., to transfer plant design flow from the equalization tank 100 to the primary settling tank 200 is employed, thus preventing hydraulic surge flows to the remainder of the waste stream. That is, the amount of wastewater, particularly raw wastewater, entering any downstream components of the system 10a, such as but not limited to the rotating biological contactor (RBC) system 300, is not allowed to exceed any pre-established design flow limits of the particular treatment system. In this manner, daily peak usage events, which would normally overwhelm conventional wastewater treatment systems, are modulated and "smoothed" out such that the system 10a can handle the increased wastewater flow in an efficient and sanitary manner.

By way of a non-limiting example, the transfer system 700 includes a waterwheel 702 that transfers the wastewater into the primary settling tank 200, e.g., via one or more fluid containers 704 (e.g., a tiltable bucket and/or the like) that is operable to pick up an amount of wastewater from the equalization tank 100 and deposit it into the primary settling tank 200. The size of the fluid containers 704 can be varied, e.g., depending on the amount of wastewater to be picked up, the intended speed of rotation of the waterwheel 702, the overall size of the system 10a, the size of the community being served, and/or the like. By way of a non-limiting example, the operable association of the equalization tank 100, that stores hydraulic surge flows from the collection system, and the use of the waterwheel 702, to transfer a maximum flow equal to plant design flow to the downstream system components, ensures that hydraulic overload of the system 10a will not occur.

By way of a non-limiting example, the present invention utilizes a four stage rotating biological contactor (RBC) system that is rotating in at least one segmented bio-zone trough or tank 400 that is resting in the wastewater in the primary settling tank 200; however, it should be appreciated that the present invention could be practiced with any type of RBC system, regardless of configuration.

The RBC system 300 can be mounted on an axial shaft system 302, with a drive motor 304 on one end, which also includes a shaft section 306 rotating the equalization waterwheel 702. This allows both the RBC system and the waterwheel 702 to be concurrently or simultaneously rotated. This shaft system 302 can be mounted such that about forty percent of the media disks 308 are submerged in the wastewater, although this amount of submersion may be adjusted in accordance with the particular application of the RBC. The fluid flow of the primary wastewater through the RBC system 300 begins at the first stage 800 and follows a serpentine pattern through the stage separating baffles of the bio-zone trough or tank 400, as will be described herein.

As noted, the first stage 800 of the RBC system 800 can be hydraulically linked to the primary settling tank 200. The wastewater then enters the first stage 800 of the RBC system 300 through an opening 900 in the end wall of the bio-zone tank 400. The wastewater then flows through a connecting pipe 1000 into the second stage 1100 of the RBC system 300 and then into the third stage 1200 though an opening 1300 in the separating baffle 1400. The wastewater then flows into stage four 1500 through the opening 1600 in the separating baffle 1700. As the wastewater is flowing through the various stages, the treatment process is occurring, as is known in the art, wherein oxygen and various microorganisms, aided by the action of the RBC system 300, are acting to break down the organic matter contained in the wastewater.

At stage four 1500, a volume of wastewater equal to the design flow can be transferred by a transfer system 1800 to the primary settling tank 200. For example, when this flow reaches stage four 1500, the waterwheel 1802, e.g., via fluid containers 1804 (e.g., tiltable buckets and/or the like), recirculates plant design flow back into the primary settling tank 200. This relatively clean, oxygen-rich treated wastewater dilutes the fluid in the primary settling tank 200, and also adds active microorganisms and oxygen to aid the activated sludge activity occurring in the primary settling tank 200. This recirculation can also be continuously feeding the accumulated sludge, in the primary settling tank 200, to the biomass on the RBC system 300 media. This enables the plant to operate in conditions of very low flow or no flow for up to six months.

Plant flow from the fourth stage 1500 gravity flows through the pipe 1900 into the weir 2000 and then into the secondary or final settling tank 500. The sludge collected in the secondary or final settling tank 500, which is oxygen-rich and contains much of the nitrates and nitrites from the RBC, can be recirculated into the equalization tank 100 that contains raw sewage that is low in oxygen and high in carbon. Sludge that accumulates in the sumps 2100 at the bottom of the secondary or final settling tank 500 can be pumped into the equalization tank 100 by the air lift pumps 2200. By way of a non-limiting example, this recirculation can be performed by the air lift pumps 2200 for one minute every twenty minutes. This recirculation helps to keep the equalization fluid aerobic and significantly increases denitrification.

System discharge gravity flows through pipe 2300, e.g., into a UV disinfection unit and/or other tertiary equipment (not shown) that may be necessary to meet a specific effluent quality, e.g., in accordance with environmental regulations. By way of a non-limiting example, supernatant can be drawn off the secondary or final settling tank 500 and passed through the tertiary equipment (if needed), disinfected, post-aerated (if needed) and discharged. For example, the tertiary equipment can be employed to change the concentration of certain contaminants including but not limited to nitrogen, phosphorous, and/or the like.

Thus, one illustration of the plant fluid flow in accordance with the general teachings of the present invention can be summarized as follows:

(1) The raw wastewater can be passed through a headworks system and/or screening and grit removal system;

(2) the raw wastewater enters the equalization tank;

(3) an amount of flow that may be as high as the plant design flow can be transferred from the equalization tank to the primary settling tank by way of a waterwheel or other suitable device;

(4) the wastewater in the primary settling tank flows into that part of the bio-zone tank containing the first stage of the RBC;

(5) the wastewater being treated in the bio-zone tanks by the RBC passes through the various (e.g., four) stages of the RBC (e.g., as previously described);

(6) when this treated fluid reaches the last (e.g., fourth) stage of the RBC, an amount of this fluid equal to plant design flow can be recirculated back into the primary settling tank by way of a waterwheel or other suitable device;

(7) an amount of this treated fluid, that can be equal in volume to the amount of fluid transferred into the primary settling tank by the equalization waterwheel, can be passed through the settling weir;

(8) the fluid passed through the settling weir can be discharged into the secondary settling tank;

(9) the solids that settle to the bottom of the secondary settling tank are periodically airlifted or otherwise transferred back into the equalization tank;

(10) an amount of supernatant fluid, that can be equal in volume to the amount of fluid transferred into the primary settling tank by the equalization waterwheel, can be drawn off and passed to the tertiary or discharge process;

(11) appropriate tertiary equipment may be used to polish the plant effluent to meet specific limits (e.g., the tertiary equipment may include membrane and/or granular polishing filters as well as other physical and/or chemical systems for nutrient removal);

(12) UV disinfection may occur before or after the tertiary equipment and it may treat the secondary supernatant directly and then pass to a flow measuring device; and

(13) the flow measuring device may discharge directly to the environment or pass through an oxygen regenerating device if needed before discharge.

It should be noted that one or more of these steps or processes can be optional, i.e., they are not necessary or required for the successful operation of the present invention. Furthermore, it should be appreciated that these steps or processes can be performed in various sequences, and that the present invention is not limited to the sequence set forth above.

The foregoing description and the Figures show that the various embodiments of the present invention are well suited to fulfill their objectives and achieve the advantages stated above. It is recognized that those skilled in the art may make various modifications or additions to the exemplary embodiments chosen to illustrate the present invention without departing from the spirit and proper scope of the invention. For example, the size of the overall devices and/or assemblies and/or the components (that is, parts) thereof can be varied in somewhat different arrangements and may be utilized for accomplishing many of the same basic objectives and advantages. Most of the components or parts shown can be made of various plastics, ceramics, selected metals or any other suitable moldable, machinable and/or formable material known or used for wastewater media or rotating biomass support structures. Accordingly, it is to be understood that the protection that is to be eventually be sought through the patent system and to be afforded hereby should be deemed to extend to novel and unobvious aspects of the subject matter disclosed herein, including all fair equivalents thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wastewater treatment system, comprising:
an equalization tank selectively operable to receive wastewater from a wastewater source;
a settling tank in fluid communication with the equalization tank;
a transfer system for transferring a predetermined amount of wastewater from the equalization tank to the settling tank, the transfer system being at least partially submerged in the wastewater in the equalization tank, the transfer system including a rotating member having at least one fluid transfer member operably associated therewith; and
a rotating biological contactor system at least partially disposed within a tank, the tank being at least partially disposed within the settling tank, wherein the wastewater in the settling tank substantially surrounds a portion of a bottom and side surface of the tank, the tank in fluid communication with the settling tank, the tank being selectively operable to receive wastewater from the settling tank;
wherein the rotating biological contactor is selectively operable to treat wastewater received from the settling tank.

2. The invention according to claim 1, further comprising a recirculation system for recirculating the treated wastewater or a component thereof from the rotating biological contactor system to the settling tank.

3. The invention according to claim 1, further comprising a second settling tank, wherein the second settling tank is in fluid communication with the rotating biological contactor system.

4. The invention according to claim 3, further comprising a second transfer system for transferring an amount of any solid wastes from the second settling tank to the equalization tank.

5. The invention according to claim 1, wherein the transfer system is selectively operable to transfer the predetermined amount of wastewater that substantially corresponds to an amount of wastewater that represents an upper limit that may be handled by the wastewater treatment system.

6. A wastewater treatment system, comprising:
an equalization tank selectively operable to receive wastewater from a wastewater source;
a settling tank in fluid communication with the equalization tank;
a transfer system for transferring a predetermined amount of wastewater from the equalization tank to the settling tank, the transfer system including a rotating member having at least one fluid transfer member operably associated therewith, a first portion of the transfer system being at least partially submerged in the wastewater in the equalization tank and a second portion of the transfer system being above the wastewater in the equalization tank; and a rotating biological contactor system at least partially disposed within a tank, the tank being at least partially disposed within the settling tank, wherein the wastewater in the settling tank substantially surrounds a portion of a bottom and side surface of the tank, the tank in fluid communication with the settling tank, the tank being selectively operable to receive wastewater from the settling tank;

wherein the rotating biological contactor is selectively operable to treat wastewater received from the settling tank.

7. The invention according to claim 6, further comprising a recirculation system for recirculating the treated wastewater or a component thereof to or from the rotating biological contactor system, the settling tank, or the equalization tank.

8. The invention according to claim 6, further comprising a second settling tank, wherein the second settling tank is in fluid communication with the rotating biological contactor system.

9. The invention according to claim 8, further comprising a second transfer system for transferring an amount of any solid wastes from the second settling tank to the equalization tank.

10. The invention according to claim 6, wherein the transfer system is selectively operable to transfer the predetermined amount of wastewater that substantially corresponds to an amount of wastewater that represents an upper limit that may be handled by the wastewater treatment system.

11. A wastewater treatment system, comprising:

an equalization tank selectively operable to receive wastewater from a wastewater source;

a settling tank in fluid communication with the equalization tank;

a transfer system for transferring a predetermined amount of wastewater from the equalization tank to the settling tank, the transfer system including a rotating member having at least one fluid transfer member operably associated therewith, a first portion of the transfer system being at least partially submerged in the wastewater in the equalization tank and a second portion of the transfer system being above the wastewater in the equalization tank;

a rotating biological contactor system at least partially disposed within a tank, the tank being at least partially disposed within the settling tank, the tank in fluid communication with the settling tank, wherein the wastewater in the settling tank substantially surrounds a portion of a bottom and side surface of the tank, the tank being selectively operable to receive wastewater from the settling tank, wherein the rotating biological contactor is selectively operable to treat wastewater received from the settling tank; and a recirculation system for recirculating the treated wastewater or a component thereof to or from the rotating biological contactor system, the settling tank, or the equalization tank;

wherein the transfer system is selectively operable to transfer the predetermined amount of wastewater that substantially corresponds to an amount of wastewater that represents an upper limit that may be handled by the wastewater treatment system.

12. The invention according to claim 11, further comprising a second settling tank, wherein the second settling tank is in fluid communication with the rotating biological contactor system.

13. The invention according to claim 12, further comprising a second transfer system for transferring an amount of any solid wastes from the second settling tank to the equalization tank.

\* \* \* \* \*